United States Patent
Lasch et al.

(10) Patent No.: US 8,079,514 B2
(45) Date of Patent: *Dec. 20, 2011

(54) METAL-CONTAINING TRANSACTION CARD AND METHOD OF MAKING THE SAME

(75) Inventors: Ellen Lasch, New York, NY (US); Lisa Ann Morrill-Webb, Darien, CT (US); Priscilla Gandel, Long Branch, NJ (US)

(73) Assignee: American Express Travel Related Services Company, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/116,922

(22) Filed: May 26, 2011

(65) Prior Publication Data

US 2011/0226858 A1    Sep. 22, 2011

Related U.S. Application Data (63) Continuation of application No. 12/911,165, filed on Oct. 25, 2010, now Pat. No. 7,971,786, which is a continuation of application No. 12/429,335, filed on Apr. 24, 2009, now Pat. No. 7,819,310, which is a continuation of application No. 10/749,006, filed on Dec. 30, 2003, now Pat. No. 7,530,491.

(60) Provisional application No. 60/437,938, filed on Jan. 3, 2003.

(51) Int. Cl.
*G06K 5/00*   (2006.01)
*G06K 19/06*  (2006.01)
*B32B 15/06*  (2006.01)

(52) U.S. Cl. ........... 235/380; 235/492; 235/493; 442/15

(58) Field of Classification Search .................. 235/380, 235/493, 487

See application file for complete search history.

(56) References Cited

U.S. PATENT DOCUMENTS

| | | |
|---|---|---|
| 3,468,046 A | 9/1969 | Shoji |
| 3,537,195 A | 11/1970 | Gerds |
| 3,583,317 A | 6/1971 | Gibson |
| 3,668,046 A | 6/1972 | Bosse |
| 4,058,839 A | 11/1977 | Darjany |
| 4,222,516 A | 9/1980 | Badet et al. |
| D264,853 S | 6/1982 | Scavino et al. |

(Continued)

FOREIGN PATENT DOCUMENTS

DE         3130213         2/1983

(Continued)

OTHER PUBLICATIONS

Notice of Allowance for U.S. Appl. No. 12/538,745 dated Jun. 20, 2011.

(Continued)

*Primary Examiner* — Thien T Mai
(74) *Attorney, Agent, or Firm* — Snell & Wilmer L.L.P.

(57) ABSTRACT

Metal-containing transaction cards, useful for the purchase of goods and/or services are disclosed. The metal-containing transaction cards may be standard-sized (i.e., about 3⅜ inches by about 2 14 inches) or any other size yet still usable as a transaction card. Moreover, the metal-containing transaction card may include a pocket having characters embossed therein. Further, the metal-containing transaction card may include a fill panel disposed within the pocket. The metal may be titanium or stainless steel.

15 Claims, 8 Drawing Sheets

U.S. PATENT DOCUMENTS

| | | | |
|---|---|---|---|
| 4,398,985 A | 8/1983 | Eagon et al. |
| 4,417,138 A | 11/1983 | Pfeiffer |
| 4,417,413 A | 11/1983 | Hoppe |
| 4,434,361 A | 2/1984 | Meinguss et al. |
| 4,542,288 A | 9/1985 | Drexler |
| 4,544,835 A | 10/1985 | Drexler |
| 4,565,922 A | 1/1986 | Anderson |
| 4,620,727 A | 11/1986 | Stockburger et al. |
| 4,677,285 A | 6/1987 | Taniguchi |
| 4,707,594 A | 11/1987 | Roth |
| 4,725,924 A | 2/1988 | Juan |
| 4,745,267 A | 5/1988 | Davis et al. |
| 4,747,620 A | 5/1988 | Kay et al. |
| 4,754,128 A | 6/1988 | Takeda et al. |
| 4,786,791 A | 11/1988 | Hodama |
| 4,788,102 A | 11/1988 | Koning et al. |
| 4,812,633 A | 3/1989 | Vogelgesang et al. |
| 4,826,772 A | 5/1989 | Meathrel |
| 4,849,618 A | 7/1989 | Namikawa et al. |
| 4,851,610 A | 7/1989 | LeBlanc et al. |
| 4,876,441 A | 10/1989 | Hara et al. |
| 4,889,755 A | 12/1989 | Charbonneau |
| 4,897,533 A | 1/1990 | Lyszczarz |
| 4,900,111 A | 2/1990 | D'Amato et al. |
| 4,918,631 A | 4/1990 | Hara et al. |
| 4,923,471 A | 5/1990 | Morgan |
| 4,938,830 A | 7/1990 | Cannistra |
| 5,049,728 A | 9/1991 | Rovin |
| 5,173,844 A | 12/1992 | Adachi et al. |
| 5,206,494 A | 4/1993 | Metzger |
| 5,217,056 A | 6/1993 | Ritter |
| 5,279,019 A | 1/1994 | Knickle |
| 5,286,958 A | 2/1994 | Smeets |
| 5,299,940 A | 4/1994 | Uenaka et al. |
| 5,300,169 A | 4/1994 | Tahara |
| 5,309,840 A | 5/1994 | Takamura et al. |
| 5,336,871 A | 8/1994 | Colgate |
| 5,356,717 A | 10/1994 | Choki et al. |
| 5,410,136 A | 4/1995 | McIntire et al. |
| 5,421,618 A | 6/1995 | Okazaki et al. |
| 5,437,897 A | 8/1995 | Tanaka et al. |
| 5,444,225 A | 8/1995 | Takahashi et al. |
| 5,451,763 A | 9/1995 | Pickett et al. |
| 5,492,370 A | 2/1996 | Chatwin et al. |
| 5,525,400 A | 6/1996 | Manser et al. |
| 5,559,370 A | 9/1996 | Berney |
| 5,569,898 A | 10/1996 | Fisher et al. |
| 5,582,103 A | 12/1996 | Tanaka et al. |
| 5,608,203 A | 3/1997 | Finkelstein et al. |
| 5,713,406 A | 2/1998 | Drury |
| 5,746,451 A | 5/1998 | Weyer |
| 5,748,737 A | 5/1998 | Daggar |
| 5,793,502 A | 8/1998 | Bianco et al. |
| 5,839,763 A | 11/1998 | McCannel |
| 5,844,230 A | 12/1998 | Lalonde |
| 5,877,941 A | 3/1999 | Ryu |
| 5,918,788 A | 7/1999 | Moorman et al. |
| 5,928,788 A | 7/1999 | Riedl |
| 5,944,356 A | 8/1999 | Bergmann et al. |
| RE36,354 E | 10/1999 | Gloton et al. |
| RE36,356 E | 10/1999 | Gloton et al. |
| 5,969,951 A | 10/1999 | Fischer et al. |
| 5,986,550 A | 11/1999 | Rapaport et al. |
| 5,988,503 A | 11/1999 | Kuo |
| 5,997,042 A | 12/1999 | Blank |
| 6,006,456 A | 12/1999 | Hiromachi et al. |
| 6,025,283 A | 2/2000 | Roberts |
| 6,079,621 A | 6/2000 | Vardanyan et al. |
| 6,116,655 A | 9/2000 | Thouin et al. |
| 6,121,069 A | 9/2000 | Boyko et al. |
| 6,146,741 A | 11/2000 | Ogawa et al. |
| 6,164,548 A | 12/2000 | Curiel |
| 6,179,338 B1 | 1/2001 | Bergman et al. |
| 6,250,555 B1 | 6/2001 | Inamoto |
| 6,291,877 B1 | 9/2001 | Usami |
| 6,294,241 B1 | 9/2001 | Kaule et al. |
| 6,328,342 B1 | 12/2001 | Belousov et al. |
| 6,337,752 B1 | 1/2002 | Heckenkamp et al. |
| 6,373,965 B1 | 4/2002 | Liang |
| 6,382,506 B1 | 5/2002 | Van Der Delk |
| 6,382,677 B1 | 5/2002 | Kaule et al. |
| 6,398,114 B1 | 6/2002 | Nishikawa et al. |
| 6,471,127 B2 | 10/2002 | Pentz et al. |
| 6,471,128 B1 | 10/2002 | Corcoran et al. |
| 6,482,330 B1 | 11/2002 | Bajorek |
| 6,491,782 B1 | 12/2002 | Jaynes |
| 6,492,717 B1 | 12/2002 | Gore et al. |
| 6,533,180 B1 | 3/2003 | Wood |
| 6,644,551 B2 | 11/2003 | Clayman et al. |
| 6,651,891 B1 | 11/2003 | Zakel et al. |
| 6,655,719 B1 | 12/2003 | Curiel |
| 6,672,525 B2 | 1/2004 | Koike et al. |
| 6,677,105 B2 | 1/2004 | Wang et al. |
| 6,715,797 B2 | 4/2004 | Curiel |
| 6,726,813 B2 | 4/2004 | Kaule et al. |
| 6,734,887 B2 | 5/2004 | Field |
| 6,749,123 B2 | 6/2004 | Lasch et al. |
| 6,764,014 B2 | 7/2004 | Lasch et al. |
| 6,832,730 B2 | 12/2004 | Conner et al. |
| 6,886,246 B2 | 5/2005 | Chung |
| 6,924,867 B2 | 8/2005 | Hinata |
| 6,942,156 B2 | 9/2005 | Ohta et al. |
| 7,036,739 B1 | 5/2006 | Mann et al. |
| 7,063,924 B2 | 6/2006 | Kaminsky et al. |
| 7,306,163 B2 | 12/2007 | Scholz et al. |
| 7,375,975 B1 | 5/2008 | Jang et al. |
| 7,377,446 B2 | 5/2008 | Ohta et al. |
| 7,461,791 B2 | 12/2008 | Keshura |
| 7,479,320 B2 | 1/2009 | Keller et al. |
| 7,494,057 B2 * | 2/2009 | Lasch et al. ............ 235/380 |
| 7,530,491 B2 | 5/2009 | Lasch et al. |
| 7,588,184 B2 | 9/2009 | Gandel et al. |
| 7,819,310 B2 * | 10/2010 | Lasch et al. ............ 235/380 |
| 7,823,777 B2 | 11/2010 | Varga et al. |
| 7,971,786 B2 * | 7/2011 | Lasch et al. ............ 235/380 |
| 2002/0070279 A1 | 6/2002 | Zausner |
| 2002/0117846 A1 | 8/2002 | Kaule et al. |
| 2002/0185561 A1 | 12/2002 | Koike et al. |
| 2003/0024995 A1 | 2/2003 | Conner et al. |
| 2003/0043485 A1 | 3/2003 | Conner et al. |
| 2003/0047253 A1 | 3/2003 | Robinson et al. |
| 2003/0102541 A1 | 6/2003 | Gore |
| 2003/0150762 A1 | 8/2003 | Biller |
| 2003/0202151 A1 | 10/2003 | Hinata |
| 2004/0026518 A1 | 2/2004 | Kudo et al. |
| 2004/0108504 A1 | 6/2004 | Forbes et al. |
| 2004/0121257 A1 | 6/2004 | Kaminsky et al. |
| 2004/0159709 A1 | 8/2004 | Ohta et al. |
| 2004/0217178 A1 | 11/2004 | Lasch et al. |
| 2005/0012326 A1 | 1/2005 | Keller et al. |
| 2005/0156318 A1 | 7/2005 | Douglas |
| 2005/0178827 A1 | 8/2005 | Shatford |
| 2005/0194453 A1 | 9/2005 | Conner et al. |
| 2005/0283839 A1 | 12/2005 | Cowburn |
| 2006/0119534 A1 | 6/2006 | Semba et al. |
| 2006/0124753 A1 | 6/2006 | Schotz et al. |
| 2006/0214008 A1 | 9/2006 | Asami et al. |

FOREIGN PATENT DOCUMENTS

| | | |
|---|---|---|
| EP | 0298687 | 7/1988 |
| EP | 0552047 | 1/1993 |
| JP | 63154269 | 10/1988 |
| WO | 2004063977 | 7/2004 |
| WO | 2006081385 | 8/2006 |

OTHER PUBLICATIONS

International Search Report and Written Opinion for PCT/US08/79016 dated Dec. 5, 2008.

www.saltlakesilver.com, Titanium ring, titanium wedding bands, silver rings, sterling silver rings, wedding bands, pp. 1-2.

www.amazon.com, price search for silver ring, Jan. 18, 2007, pp. 1-4.

International Search Report for PCT/US03/41641 dated Jul. 23, 2004.

International Search Report for PCT/US2006/002864 dated May 18, 2006.

IBM Technical Disclosure Bulletin (NN86044723).

Notice of Allowance for U.S. Appl. No. 11/713,968 mailed Oct. 23, 2008.
Notice of Allowance for U.S. Appl. No. 11/044,662 dated Jul. 31, 2009.
Notice of Allowance for U.S. Appl. No. 10/749,006 mailed Mar. 10, 2009.
Non-Final Office Action for U.S. Appl. No. 12/125,750 dated Aug. 3, 2010.
Notice of Allowance for U.S. Appl. No. 12/125,750 dated Sep. 10, 2010.
Notice of Allowance for U.S. Appl. No. 12/429,335 dated Jul. 23, 2010.
International Search Report and Written Opinion for PCT/US2010/044848 dated Oct. 20, 2010.
Non-Final Office Action for U.S. Appl. No. 12/911,165 dated Jan. 7, 2011.
Notice of Allowance for U.S. Appl. No. 12/911,165 dated Mar. 4, 2011.
Non-Final Office Action for U.S. Appl. No. 12/538,745 dated May 3, 2011.
www.amazon.com, price search for titanium ring, Jan. 18, 2007, pp. 1-4.
Examiner's Report dated Sep. 28, 2011 in Chilean Application No. 1272-2009.
Notice of Allowance dated Aug. 8, 2011 in Canadian Application No. 2,512,086.

* cited by examiner

METAL-CONTAINING TRANSACTION CARD AND METHOD OF MAKING THE SAME

CROSS-REFERENCE TO RELATED APPLICATIONS

The present application is a continuation of, and claims priority to U.S. Pat. No. 7,971,786 issued on Jul. 5, 2011 (aka U.S. patent application Ser. No. 12/911,165 filed Oct. 25, 2010) and entitled "Metal-Containing Transaction Card and Method of Making the Same." The '786 patent is a continuation of, and claims priority to U.S. Pat. No. 7,819,310 issued on Oct. 26, 2010 (aka U.S. patent application Ser. No. 12/429,335, filed Apr. 24, 2009) and entitled "Metal-Containing Transaction Card and Method of Making the Same." The '310 patent is a continuation of, and claims priority to, U.S. Pat. No. 7,530,491 issued on May 12, 2009 (aka U.S. patent application Ser. No. 10/749,006, filed Dec. 30, 2003) and entitled "Metal Transaction Card and Method of Making the Same." The '491 patent claims the benefit of U.S. Provisional Patent Application Ser. No. 60/437,938, filed on Jan. 3, 2003 and entitled "Titanium-Containing Transaction Card and Method of Making the Same." All the above referenced applications are hereby incorporated by reference in their entirety.

BACKGROUND OF THE INVENTION

Metal-containing transaction cards useful for the purchase of goods and/or services and methods of making the same are provided. The metal-containing transaction cards may be credit cards, debit cards, check cards, stored-value cards, or any other transaction card. Each card may be standard-sized (i.e., about 3⅜ inches by about 2¼ inches) or any other size yet still usable as a transaction card. Moreover, the metal-containing transaction cards may have a magnetic stripe, an embedded microchip, a signature panel, a holographic image, or any other feature typically contained on or within a transaction card. The transaction cards have at least one layer of metal.

The proliferation of transaction cards, which allow the cardholder to pay with credit rather than cash, started in the United States in the early 1950s. Initial transaction cards were typically restricted to select restaurants and hotels and were often limited to an exclusive class of individuals. Since the introduction of plastic credit cards, the use of transaction cards have rapidly proliferated from the United States, to Europe, and then to the rest of the world. Transaction cards are not only information carriers, but also typically allow a consumer to pay for goods and services without the need to constantly possess cash, or if a consumer needs cash, transaction cards allow access to funds through an automatic teller machine (ATM). Transaction cards also reduce the exposure to the risk of cash loss through theft and reduce the need for currency exchanges when traveling to various foreign countries. Due to the advantages of transaction cards, hundreds of millions of cards are now produced and issued annually, thereby resulting in a need for companies to differentiate their cards from competitor's cards.

Initially, the transaction cards often included the issuer's name, the cardholder's name, the card number, and the expiration date embossed onto the card. The cards also usually included a signature field on the back of the card for the cardholder to provide a signature to protect against forgery and tampering. Thus, the cards served as devices to provide data to merchants and the security associated with the card was the comparison of the cardholder's signature on the card to the cardholder's signature on a receipt along with the embossed cardholder's name on the card.

Due to the popularity of transaction cards, numerous companies, banks, airlines, trade groups, sporting teams, clubs and other organizations have developed their own transaction cards. As such, many companies continually attempt to differentiate their transaction cards and increase market share not only by offering more attractive financing rates and low initiation fees, but also by offering unique, aesthetically pleasing features on the transaction cards. As such, many transaction cards include not only demographic and account information, but the transaction cards also include graphic images, designs, photographs and security features. A recent security feature is the incorporation of a diffraction grating, or holographic image, into the transaction card which appears to be three-dimensional. Holographic images restrict the ability to fraudulently copy or reproduce transaction cards because of the need for extremely complex systems and apparatus for producing holograms.

Administrative and security issues, such as charges, credits, merchant settlement, fraud, reimbursements, etc., have increased due to the increasing use of transaction cards. Thus, the transaction card industry started to develop more sophisticated transaction cards which allowed the electronic reading, transmission, and authorization of transaction card data for a variety of industries. For example, magnetic stripe cards, optical cards, smart cards, calling cards, and supersmart cards have been developed to meet the market demand for expanded features, functionality, and security. In addition to the visual data, the incorporation of a magnetic stripe on the back of a transaction card allows digitized data to be stored in machine readable form. As such, magnetic stripe readers are used in conjunction with magnetic stripe cards to communicate purchase data received from a cash register device on-line to a host computer along with the transmission of data stored in the magnetic stripe, such as account information and expiration date.

Due to the susceptibility of the magnetic stripe to tampering, the lack of confidentiality of the information within the magnetic stripe and the problems associated with the transmission of data to a host computer, integrated circuits were developed which could be incorporated into transaction cards. These integrated circuit (IC) cards, known as smart cards, proved to be very reliable in a variety of industries due to their advanced security and flexibility for future applications. However, even integrated circuit cards are susceptible to counterfeiting.

As magnetic stripe cards and smart cards developed, the market demanded international standards for the cards. The card's physical dimensions, features and embossing area were standardized under the International Standards Organization ("ISO"), ISO 7810 and ISO 7811. The issuer's identification, the location of particular compounds, coding requirements, and recording techniques were standardized in ISO 7812 and ISO 7813, while chip card standards were established in ISO 7813. For example, ISO 7811 defines the standards for the magnetic stripe which is a 0.5 inch stripe located either in the front or rear surface of the card and which is divided into three longitudinally parallel tracks. The first and second tracks hold read-only information with room for 79 alphanumeric characters and 40 numeric characters, respectively. The third track is reserved for financial transactions and includes enciphered versions of the user's personal identification number, country code, currency units, amount authorized per cycle, subsidiary accounts, and restrictions.

More information regarding the features and specifications of transaction cards can be found in, for example, *Smart*

*Cards* by Jose Luis Zoreda and Jose Manuel Oton, 1994; *Smart Card Handbook* by W. Rankl and W. Effing, 1997, and the various ISO standards for transaction cards available from ANSI (American National Standards Institute), 11 West 42nd Street, New York, N.Y. 10036.

The incorporation of machine-readable components onto transactions cards encouraged the proliferation of devices to simplify transactions by automatically reading from and/or writing onto transaction cards. Such devices include, for example, bar code scanners, magnetic stripe readers, point of sale terminals (POS), automated teller machines (ATM) and card-key devices. With respect to ATMs, the total number of ATM devices shipped in 1999 was 179,274 (based on Nilson Reports data) including the ATMs shipped by the top ATM manufacturers, namely NCR (138-18 231st Street, Laurelton, N.Y. 11413), Diebold (5995 Mayfair, North Canton, Ohio 44720-8077), Fujitsu (11085 N. Torrey Pines Road, La Jolla, Calif. 92037), Omron (Japan), OKI (Japan) and Triton.

Typical transaction cards are made from thermoplastic materials, such as polyvinyl chloride (PVC) and polyethylene terephthalate (PET). However, these transaction cards are susceptible to being damaged or destroyed if exposed to damaging environments. For example, transaction cards may be damaged if left exposed to the elements for an extended period of time. Moisture and/or sunlight may break down the chemical bonds within the polymers of typical transaction cards, such that transaction cards left exposed to moisture and sunlight may become warped, cracked and unusable. In addition, thermoplastic transaction cards may be easily bent or may be broken or cut, thereby damaging the transaction card and rendering it unusable.

A need, therefore, exists for a transaction card that has both strength and durability. Moreover, a need exists for a transaction card that withstands exposure to the elements, such as moisture or sunlight. A need further exists for a transaction card that may incorporate the features noted above, such as holograms, signature panels, magnetic stripes, microchips, and the like, such that is has both strength and durability. In addition, a need exists for a transaction card that overcomes the problems noted above.

SUMMARY OF THE INVENTION

The present invention relates to a metal-containing transaction card and a method of making the same. The metal-containing transaction card may be standard-sized (i.e., about 3⅜ inches by about 2¼ inches) or any other size yet still usable as a transaction card. Moreover, the transaction card may have a magnetic stripe, an embedded microchip, a signature panel, a holographic image, or any other feature typically contained on or within the transaction card. The transaction card of the present invention has at least one layer of metal. Preferably, the transaction card of the present invention has at least one layer of titanium or stainless steel.

A transaction card and a method of making the same are provided whereby the transaction card has at least one layer of metal. The at least one layer of metal provides durability and strength to the transaction card. The one layer of metal may be any metal able to be utilized as a transaction card or incorporated into or within a transaction card. Preferably, the at least one layer of metal is titanium, stainless steel or aluminum.

Further, a transaction card having at least one layer of metal is provided whereby the transaction card is of a standard size, i.e., compliant with the International Standards Organization (ISO) for transaction cards.

In addition, a transaction card having at least one layer of metal may further have other layers that include one or more polymeric materials or other metal material, such as aluminum and the like.

Still further, a metal-containing transaction card is provided having features typically contained on or in transaction cards, such as magnetic stripes, embedded microchips, signature panels, holographic images, and the like. Moreover, the metal-containing transaction card may be printed with indicia, such as via screen-printing or a laser-etching process to uniquely identify the transaction card and/or the issuer of the transaction card or any other information.

Still further, a method of making a single transaction is provided comprising embossing the single transaction card within a pocket to form embossed characters on a first surface of the single transaction card and filling the pocket with a fill panel to provide a substantially flush surface on a second surface of the single transaction card, wherein an entire surface of the single transaction card is comprised of a continuous metal layer and, wherein a third surface of the fill panel is in uniform, direct contact with an interior of the pocket.

Further still, a method of making a single transaction is provided comprising cutting a pocket within the single transaction card and applying a recordable medium on the single transaction card for storing information relating to a transaction account, wherein the single transaction card is comprised of a continuous metal layer, wherein the single transaction card is configured to be embossed within the pocket to provide embossed characters on a first surface of the single transaction card, wherein the single transaction card is configured to have a fill panel disposed within the pocket to provide a substantially flush surface on a second surface of the single transaction card, wherein a third surface of the fill panel is configured to be in uniform, direct contact with an interior of the pocket.

Additional features and advantages of the present invention are described in, and will be apparent from, the detailed description of the presently preferred embodiments and from the drawings.

DETAILED DESCRIPTION

Metal-containing transaction cards and methods of making the same are provided. The transaction cards may be standard-sized (i.e., about 3⅜ inches by about 2¼ inches) or any other size yet still usable as a transaction card. Moreover, the transaction card may have a magnetic stripe, an embedded microchip, a signature panel, a holographic image, or any other feature typically contained on or within a transaction card. The transaction cards have at least one layer of metal, preferably titanium or stainless steel.

Figure 1A:
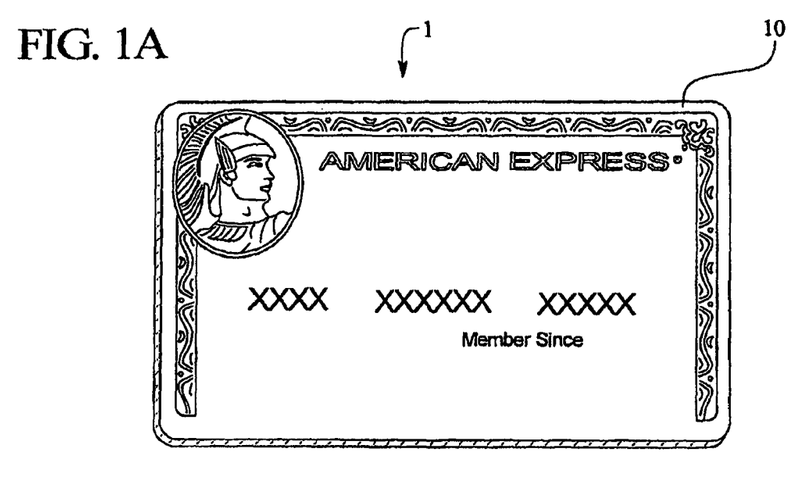
FIG. 1A illustrates a plan view of a front face of a metal-containing transaction card.

Referring now to the drawings, wherein like numerals refer to like parts, FIG. 1 illustrates a plan view of a metal-containing transaction card 1 having a front face 10. The transaction card 1 is composed of at least one layer of metal that has been flattened into a card shape. Typically metal can be rolled into a sheet. The sheet can then be cut to form individual transaction cards.

Any metal may be utilized as the layer or layers of the transaction cards described herein. Specifically, the metals may include titanium, stainless steel, or aluminum, although any other metal is contemplated by the present invention.

On the front face 10 of the transaction card 1 may be indicia, such as images, graphics, words, or other symbols, that may be printed on the front face 10 using conventional printing techniques. Alternatively, the indicia may be laser-etched. A typical laser-etching device for laser-etching metal, such as titanium or stainless steel, is done by a laser from Virtek Vision International, Inc. Lasers can provide marking of metals such as titanium, stainless steel or aluminum of depths of up to 0.100 inches and as low as about 0.003 inches. A pattern may be laser marked onto the front face 10 (or the rear face 20, as described below and illustrated by FIG. 1B).

In addition, the laser-etching of the metal layer, typically titanium, may provide the transaction card 1 with a plurality of colors on one or both of the faces of the card 1. Specifically, the energy utilized to laser-etch the metal may allow the metal to recrystallize in such a way as to be viewable by an individual as being of a specific color or colors.

In an alternative embodiment, one or both faces of the transaction card 1 may be anodized using conventional anodizing methods, thereby providing a surface on one or both faces of the transaction card 1 that may sealed with an oxide layer thereby protecting the metal and allowing the surface to be receptive to printing inks or coatings. In addition, the anodizing process may provide a color to one or both faces of the transaction card 1. For example, the anodizing process may comprise treatment of the surface of the metal with an ionic solution under an electrical current, which can provide one or both faces of the transaction card 1 with a color depending on the voltage of the electricity that is used to anodize the one or both faces of the transaction card 1.

A coating may be applied to one or both faces of the transaction card 1. Preferably, the coating may be a silane compound thereby providing the metal in the transaction card 1 resistance to scratches, damage, fingerprints, and the like. In addition, a dye or ink may be incorporated into the silane coating thereby providing the transaction card 1 with a particular color. Typically, the silane and the dye are provided across one or both surfaces of the transaction card 1. Preferably, the silane coating may be incorporated with a black dye whereby one or both faces of the transaction card 1 will have a black appearance. Of course, any other colored coating may be applied to the surface of one or both faces of the transaction card 1 after the surface of one or both faces of the transaction card 1 are anodized, such as acrylic or polyethylene terephthalate. In addition, the surface coating may be comprised of a thermoset polymeric material, applied to one or both faces of the transaction card. The thermoset material may be applied to the transaction card 1 by coating one or both faces of the transaction card 1 with dry powder of the thermoset material, and baking the thermoset material to melt the same and set the material on the surface of the transaction card 1. Of course, the transaction card 1 may be provided with no colored coating, thereby providing a metal-colored transaction card, whereby the natural color of the metal may be viewable.

Figure 1B:
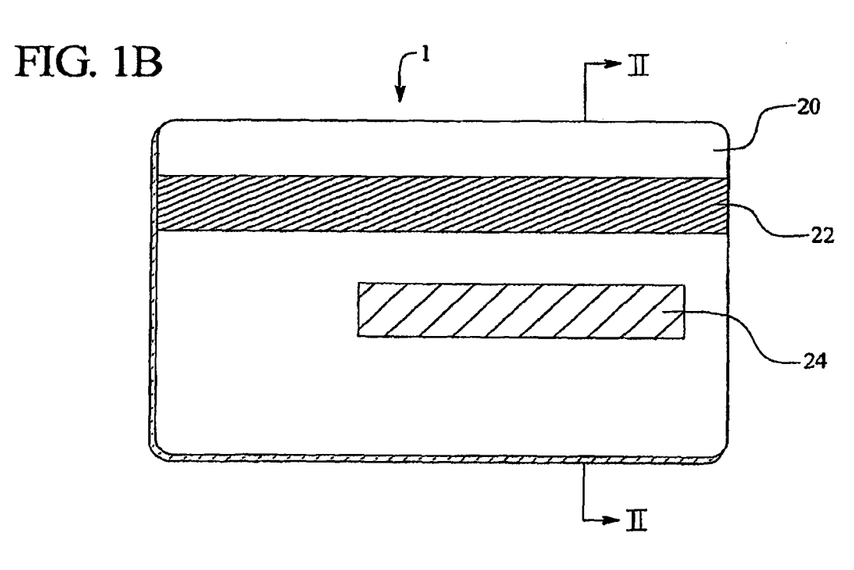
FIG. 1B illustrates a plan view of a back face of a metal-containing transaction card.

FIG. 1B illustrates a rear face 20 of the transaction card 1 of the present invention. Provided on the rear face 20 may be a magnetic stripe 22 that may be applied to the rear face 20 using conventional methods, such as by stamping the magnetic stripe to the transaction card 1. Moreover, a signature panel 24 may be provided as well and may also be stamped to the transaction card 1 or applied via any other conventional method. The signature panel allows the owner of the transaction card to place his or her signature on the transaction card, thereby providing a security feature. In addition, a microchip may be embedded into the transaction card of the present invention. Of course, any other feature may be included on the front face 10 or the rear face 20 of the transaction card 1 as may be apparent to one having ordinary skill in the art.

Figure 2A:
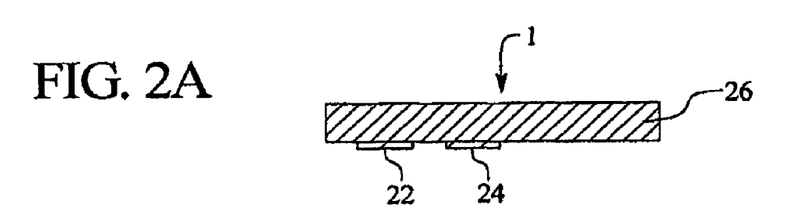
FIG. 2A illustrates a cross-sectional view of a metal-containing transaction card along line II-II of FIG. 1B.

FIG. 2A illustrates a cross-sectional side view of the transaction card 1 along lines II-II of FIG. 1B. As illustrated, the transaction card 1 includes at least a first layer 26 of metal. Of course, the transaction card 1 may comprise two or more layers of metal that are adhered together via heat, pressure, and/or adhesive. Preferably, the transaction card 1 contains at least one layer of titanium or stainless steel. The first layer 26 further includes the magnetic stripe 22 and the signature panel 24 adhered directly to the first layer 26 of metal. Preferably, the total thickness of the first layer 26 is about 30 mils, although other thicknesses of the first layer 26 are contemplated by the present invention.

The layers illustrated in FIGS. 2A-2E are exaggerated in thickness to clearly illustrate the structures of the transaction cards described herein.

The transaction card 1 may be stamped, embossed or etched to provide texture, images, alphanumeric characters, or the like. As described above, the front or rear surfaces of the transaction card 1 may be printed or laser-etched to provide indicia, such as graphics, images, text, or any other indicia. In addition, the surface of each face of the first layer 26 may be anodized and/or coated with a coating to protect the surfaces of the metal and/or to provide the surfaces with a color. Moreover, an adhesive (not shown) may be provided for adhering the magnetic stripe 22 and the signature panel 24 to the metal of the first layer 26. Further, a microchip (not shown) may be embedded into the first layer 26 of metal to provide smart card capabilities to the transaction card made therefrom.

Figure 2B:
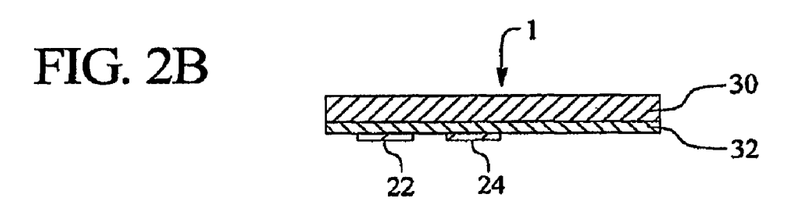
FIG. 2B illustrates a cross-sectional view of an alternate embodiment of a transaction card along line II-II of FIG. 1B.

FIG. 2B illustrates an alternate embodiment of the present invention of a cross-sectional view of the transaction card 1 along line II-II of FIG. 1B. As illustrated, the transaction card 1 includes a metal layer 30, and an optional adhesive layer 32 to adhesively secure the magnetic strip 22 and signature panel 24 to the metal layer 30. The adhesive layer 32 may be laminated, coated, or otherwise applied to the metal layer 30. Preferably, the total thickness of the transaction card 1 including the metal layer 30 and the adhesive layer 32, as illustrated in FIG. 2B, is about 30 mils, although other thicknesses are contemplated in the present invention. Preferably, the metal layer 30 is made of titanium or stainless steel.

Alternatively, the transaction card does not include an adhesive layer, as illustrated in FIG. 2A, and the magnetic stripe 22 and/or signature panel 24, as well as any other feature, is applied directly to one or both surfaces of the metal layer 30. Alternatively, the transaction card 1 may have an adhesive layer (not shown) provided on the front face 10 of the transaction card 1 for adhering inks or other printing to the metal layer 30.

The transaction card of FIG. 2B may be stamped, embossed or etched to provide texture, images, graphics, alphanumeric characters or the like to the transaction card. As described above, the front or rear surfaces of the transaction card may be printed or laser-etched to provide indicia, such as graphics, images, text, or any other indicia.

Figure 2C:
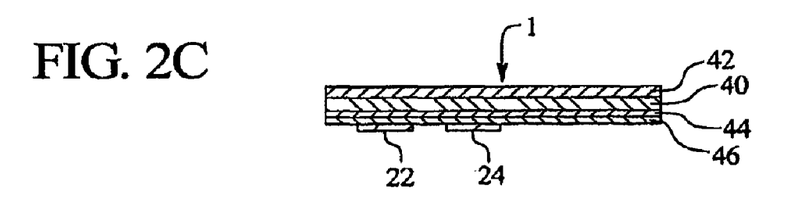
FIG. 2C illustrates a cross-sectional view of another alternate embodiment of a transaction card along line II-II of FIG. 1B.

FIG. 2C illustrates an alternate embodiment of the present invention of a cross-sectional view of a transaction card taken along line II-II of FIG. 1B. In the embodiment illustrated in FIG. 2C, the transaction card 1 comprises a core layer 40 of a substrate, such as a thermoplastic material of, for example, PVC, PET copolymer, or other substrate. Further, the core layer 40 has a layer of metal laminated to one or both sides of the core layer 40. In FIG. 2C, the core layer 40 has a first metal layer 42 laminated or otherwise disposed adjacent to a first surface of the core layer 40 and a second metal layer 44 laminated or otherwise disposed adjacent to a second surface of the core layer 40. The core layer 40 may be about 18 mils, while each metal layer 42, 44 may be about 6 mils to provide a transaction card that is about 30 mils in total thickness. However, the core layer 40 and metal layers 42, 44 may be any thickness. Preferably, the metal layers 42, 44 are titanium or stainless steel.

Provided on the second metal layer 44 may be an adhesive 46 laminated or otherwise applied thereto for providing adhesion for the magnetic stripe 22, signature panel 24, or other feature typically included on a transaction card. Alternatively, an adhesive layer (not shown) is provided on the first metal layer 42 for providing adhesion to inks for printing purposes, or for any other reason. Alternatively, there is no adhesive layer between the magnetic stripe 22, signature panel 24, or other feature typically included on the transaction card and the first and/or second metal layers 42, 44.

In addition, the transaction card of FIG. 2C may be stamped, embossed or etched to provide texture, images, graphics, alphanumeric characters or the like to the transaction card. As described above, the front or rear surfaces of the transaction card may be printed or laser-etched to provide indicia, such as graphics, images, text, or any other indicia.

Figure 2D:
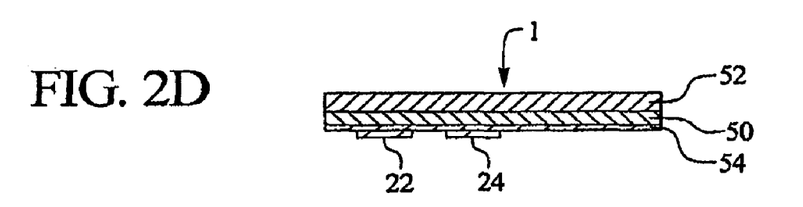
FIG. 2D illustrates a cross-sectional view of a still further alternate embodiment of a transaction card along line II-II of FIG. 1B.

FIG. 2D illustrates a fourth embodiment of the present invention, whereby the transaction card 1, illustrated in a cross-sectional view in FIG. 2D, comprises a first layer 50 of a substrate, such as a thermoplastic material of, for example, PVC or PET copolymer, and a second layer 52 of metal laminated or otherwise disposed adjacent to the first layer 50. The first layer 50 and the second layer 52 may have thicknesses that sum to about 30 mils. For example, the first layer may be about 18 mils and the second layer (of metal) may be about 12 mils. However, the layers may be any other thicknesses. Preferably, the second layer 52 of metal is titanium or stainless steel.

The first layer 50 may further include an adhesive 54 to provide adhesion to the magnetic stripe 22, the signature panel 24, or to any other feature contained on the transaction card 1. Alternatively, no adhesive layer is present.

Figure 2E:
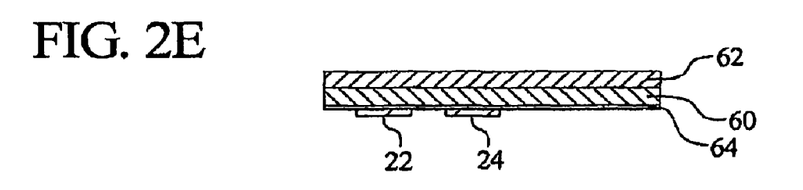
FIG. 2E illustrates a cross-sectional view of another alternate embodiment of a transaction card along line II-II of FIG. 1B.

FIG. 2E illustrates a fifth embodiment of the present invention, whereby the transaction card 1, illustrated in a cross-sectional view in FIG. 2E, comprises a first layer 60 of a metal substrate, such as aluminum, or other metal substrate, and a second layer 62 of a second metal laminated or otherwise disposed adjacent to the first layer 60. Preferably, the second layer 62 is titanium or stainless steel, although other metals are contemplated by the present invention. As with the transaction cards described above, the first layer 60 may have an adhesive layer 64 laminated or otherwise applied thereto for providing adhesion to the magnetic stripe 22 or the signature panel 24. As with the other embodiment described above, the adhesive may be provided on the second layer as well for providing adhesion to inks for printing, or for other features typically contained on a transaction card. Alternatively, no adhesive layer is present.

Figure 3:
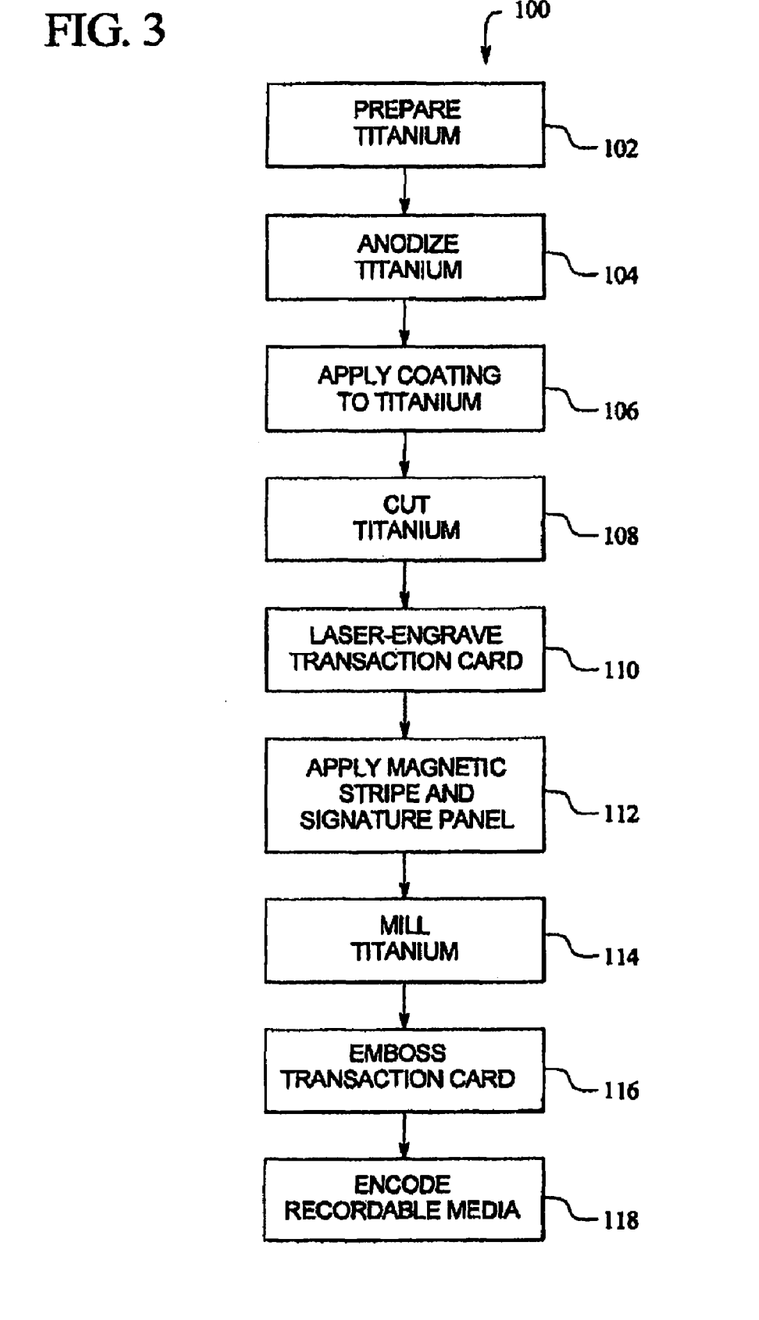
FIG. 3 illustrates a flow chart showing a method of making metal-containing transaction cards.

FIG. 3 illustrates a method 100 of making a metal-containing transaction card of the present invention, wherein the metal is titanium. Specifically, the method 100 includes a first step 102 of preparing the titanium to form into transaction cards. Specifically a sheet of titanium may be prepared that is about 30 mils thick. Typically, the titanium metal is rolled and flattened to the required thickness. Preferably, the titanium sheet comprises titanium metal that has little to no magnetic properties, so that the titanium does not interfere with the magnetic stripe and/or microchip that may be embedded within the transaction card.

In an anodizing step 104, the titanium sheet is anodized using a conventional anodizing process. Specifically, the titanium may be disposed in a bath having ions and an electrical current therein to anodize one or both of the faces of the sheet of titanium. As noted above, anodizing the sheet of titanium can provide one or both faces of the sheet of titanium with a colored surface, depending on the current that is supplied during the anodizing process, as is apparent to one having ordinary skill in the art. Moreover, anodizing oxidizes the surface of the titanium, thereby sealing and protecting the titanium.

In a coating step 106, a coating is applied to one or both faces of the sheet of titanium to provide one or both faces of the sheet with a color and to further protect the titanium. Specifically, the coating may be a silane coating having a dye contained therein, wherein the silane is coated as a layer on one or both faces of the transaction card. The silane coating may be applied in a waterless solvent or a water-based system.

In addition, other materials that may be coated to one or both faces of the transaction card are polyethylene terephthalate and acrylic, although any other coating may be utilized to provide a coating to protect the titanium and, optionally, to provide a color to the one or both faces of the transaction card. For example, the coating may be made from a thermoset material that may be sprayed onto the one or both faces of the transaction card in powder form. The transaction card may then be baked, and the powder may melt to the surface of the transaction card.

Step 108 illustrates a cutting step whereby the sheet of titanium, which may have been anodized and/or coated as described above, may be cut into individual transaction card shapes. Common methods of cutting titanium include, but are not limited to, water jet cutting, die cutting, laser cutting or plasma cutting. The goal in cutting the titanium is to easily and efficiently cut the titanium sheet into transaction card shapes while avoiding sharp edges.

After cutting the titanium sheet via step 108, the individual transaction cards may be laser-engraved via a laser-engraving step 110. The laser engraving may be done via commonly known laser engraving techniques to provide a pattern in one or both faces of the transaction card. Moreover, the laser engraving may cut away a coating that may be disposed on the one or both faces of the transaction card, thereby providing a visible pattern. For example, if a black coating is applied to the titanium sheet via step 106, the laser beam may etch a pattern in the black coating to give a pattern that is not black, but may be metal colored, or colored in any other way. In addition, the laser beam may melt the surface of one or both faces of the transaction card, which may cause the titanium to recrystallize when cooled. The recrystallization may produce a variety of colors in the surface of one or both faces of the transaction card. Preferably, the laser engraving step 110 may be accomplished via a laser, such as, for example, a YAG laser having a wavelength of about 1064 nanometers. Of course, any other laser may be utilized that provides a pattern, a texture or a color to the titanium as may be apparent to one having ordinary skill in the art.

After laser engraving the transaction card, a magnetic stripe and signature panel of the transaction card may be applied to the transaction card via step 112. Typically, the magnetic stripe and the signature panel are stamped using techniques common in the art of making transaction cards. Specifically, the magnetic stripe and signature panel are applied to one or both of the faces of the transaction card with the use of an adhesive that may be applied on one or both faces of the transaction card. Preferably, the adhesive may be screen-printed to one or both faces of the transaction card, although any other method of applying the adhesive is contemplated by the present invention. Most materials require the use of an adhesive to stick to one or both faces of the transaction card. However, certain coatings may allow the magnetic stripe and the signature panel to be applied without the use of adhesives. For example, a coating of thermoplastic, such as a flat black vinyl thermoplastic, may be coated onto the card and may allow the magnetic stripe and the signature panel to be applied to the transaction card without adhesive. The stamping process may melt the thermoplastic material, thereby allowing the thermoplastic material to adhere the magnetic stripe and/or the signature panel when cooled and solidified.

After the magnetic stripe and the signature panel have been applied to the transaction card, the transaction card may be milled via step 114 to provide a space to apply an embedded microchip for a smart card. The milling process may be done in a similar manner to conventional plastic transaction cards, but may be accomplished with a boron nitride, boron carbide tipped machine or other machine able to mill titanium. In addition, the transaction card may be milled via a cryo-milling process, in which the mill head is cooled with a stream of liquid nitrogen to ensure that the transaction card and/or the mill head does not overheat. Typically, the transaction card may have an area about 20 to about 25 mils deep milled from the transaction card to provide a space for the microchip. The microchip may be applied to the milled area of the transaction card, and may stay within the milled area due to an adhesive that may be provided.

After milling the transaction card to embed the microchip therein, the transaction card may be embossed via an embossing step 116. Specifically, the embossing may be done by subjecting the transaction card to a high pressure die that may punch a character or a plurality of characters into the surface of the transaction card. The embossing may be done to provide information on the surface of the transaction card that may be readable by an individual or a machine. Specifically, an account number or other unique identifier is typically embossed on a transaction card. Preferably, the embossing step 116 may be accomplished with an addressograph machine. Of course, other methods of embossing the transaction card are contemplated, and the invention should not be limited as herein described.

Finally, the transaction card may be encoded via step 118 via any encoding steps commonly used to encode the transaction cards. Specifically, either or both of the recordable media, such as the magnetic stripe and/or the microchip, may be encoded to provide the transaction card having information contained thereon within the recordable media. The recordable media may be read via a magnetic stripe reader or a microchip reader, as may be apparent to one having ordinary skill in the art.

Figure 4:
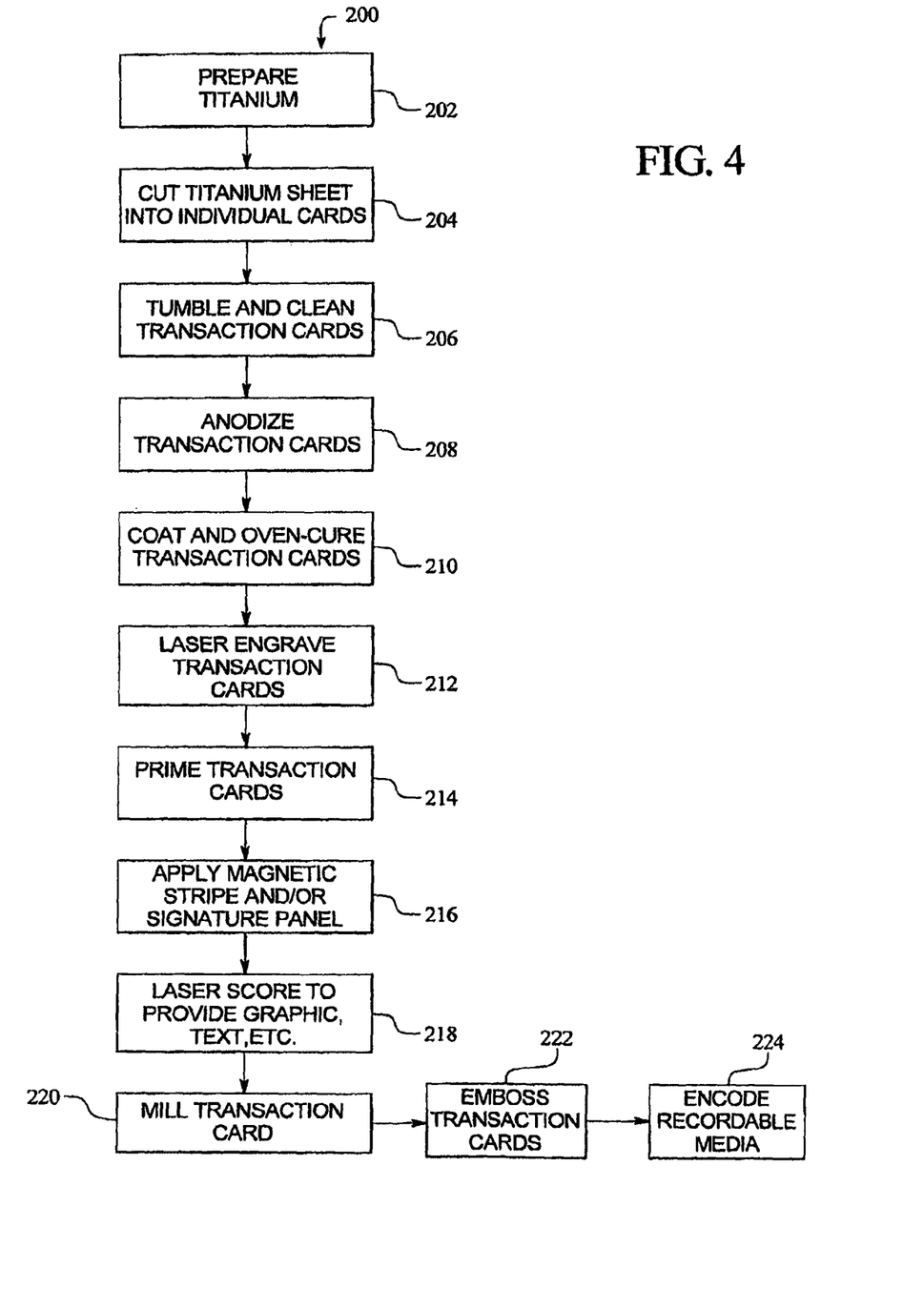
FIG. 4 illustrates a flow chart showing an alternate method of making titanium transaction cards.

FIG. 4 illustrates an alternate method 200 of making transaction cards comprising titanium. The method 200 comprises a first step 202 of preparing the titanium by rolling and flattening the titanium into a sheet to form into transaction cards. The first step 202 may be substantially similar to the first step 102 described above with respect to FIG. 3.

After the titanium sheet is prepared via step 202, the titanium sheet may be cut in a cutting step 204, whereby the sheet of titanium may be cut into individual transaction card shapes. For example, the titanium sheet may be cut via the methods described above with respect to step 108 of FIG. 3.

Once the individual transaction cards have been cut from the titanium sheet, each individual transaction card may be tumbled and cleaned to smooth any sharp edges via a tumbling and cleaning step 206. It is important to ensure that all of the edges are smooth.

After the transaction cards have been smoothed and cleaned, each transaction card may be anodized and primed via an anodizing step 208. The anodizing step may be substantially similar to the anodizing step 104 as described above with reference to FIG. 3.

After being anodized and primed, each transaction card may be coated and oven cured via a coating step 210. The coating step 210 may be substantially similar to the coating step 106 as described above with reference to FIG. 3. Each side of each transaction card may be coated and oven-cured separately in a multi-step process.

After each side of each transaction card is coated and oven-cured, each transaction card may be laser engraved via laser engraving step 212, which may be substantially similar to the laser-engraving step 110, as described above with reference to FIG. 3.

Once each transaction card is laser engraved, a primer may be applied to one or both of the surfaces by screen printing the primer via a priming step 214. The primer may be applied across the entire surface of each transaction card, or may be applied precisely where a magnetic stripe and/or signature panels are desired.

After each transaction card is primed, the magnetic stripe and/or signature panels may be applied via step 216. The magnetic stripe and/or signature panel may be applied in a substantially similar way as described in step 112, described above with respect to FIG. 3.

After the magnetic stripe and/or signature panels have been applied, each of the surfaces of each transaction card may be laser scored via step 218 to provide graphics, text and numerals to either or both of the surfaces of each transaction card.

Once each transaction card has been laser scored to provide graphics, text or numerals, a microchip may be disposed within the transaction card via step 220. For example, the transaction card may be milled to provide a space in the transaction card for an embedded microchip. The disposing of the microchip into the transaction card may be done in a substantially similar manner as step 114, described above with reference to FIG. 3.

Each transaction card may then be embossed via an embossing step 222, which may be substantially similar to the embossing step 118, as described above with reference to FIG. 3. Further, the magnetic stripe and/or microchip may be encoded. The transaction cards may then be shipped to customers.

Finally, each transaction card's recordable media, such as the magnetic stripe and/or the embedded microchip, may be encoded via an encoding step 224.

Figure 5:
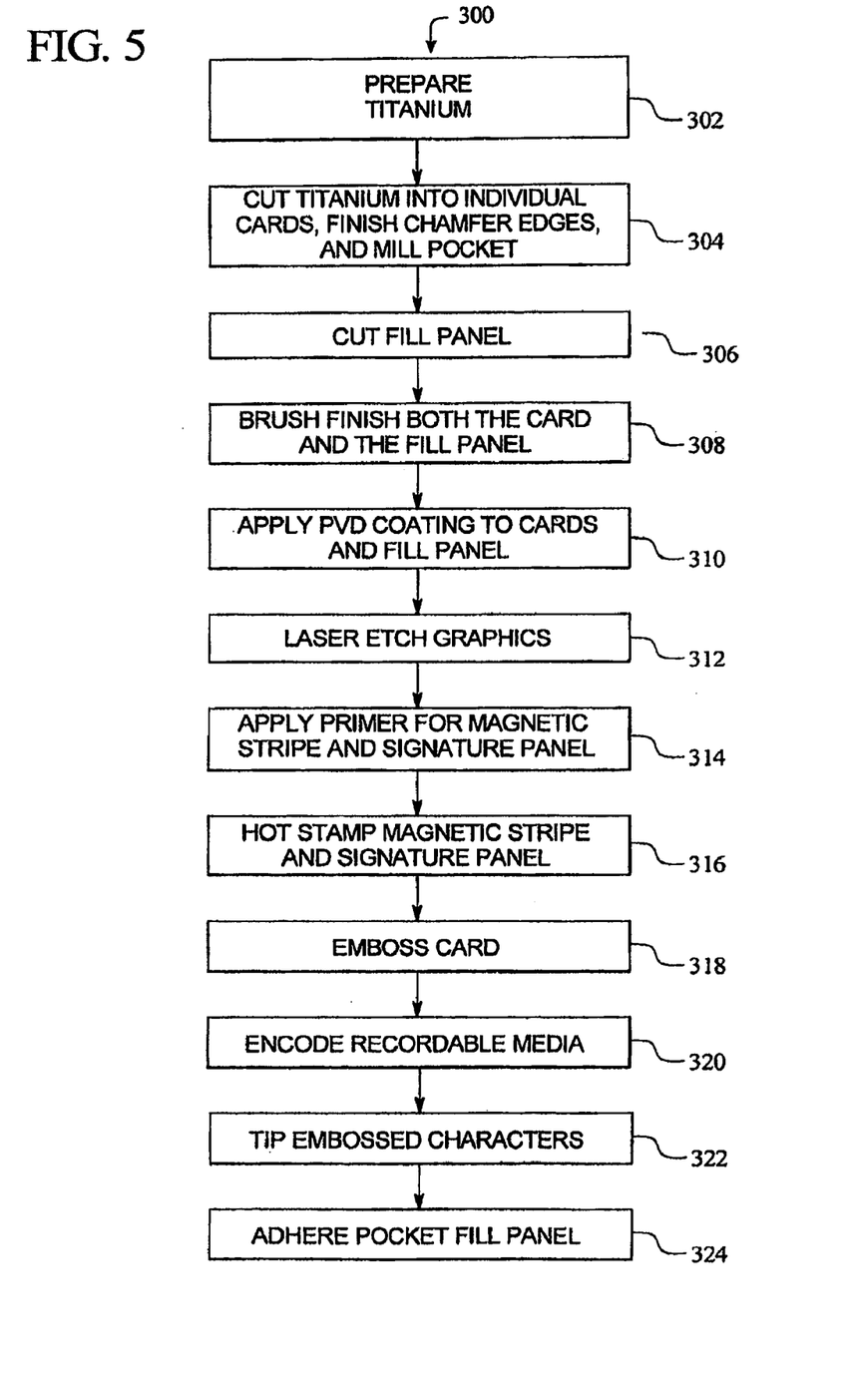
FIG. 5 illustrates another flow chart showing an alternate methods of titanium transaction cards.

In an alternate method of making titanium transaction cards 300 illustrated in FIG. 5, sheets of titanium are prepared via step 302. The titanium sheets may be prepared as described above in steps 102, 104 with respect to FIGS. 3, 4. Specifically sheets of titanium may be prepared that are about 30 mils thick. In addition, sheets of titanium may be prepared that are about 15 mils thick, that will be cut into fill panels, as described below. Typically, the titanium metal is rolled and flattened to the required thickness. Preferably, the titanium sheets comprise titanium metal that has little to no magnetic properties, so that the titanium does not interfere with the magnetic stripe and/or a microchip that may be embedded within the transaction card.

The 30 mil thick titanium sheets are then cut into individual cards via step 304. At the same time, the edges of the individual cards may be beveled to create camfer edges. Preferably, the camfer edges may be prepared on both sides of each individual card on all four edges of each titanium card. Alternatively, the camfer edges may be prepared on only one side of each titanium card, such as on a front surface of each titanium card. In addition, at the same time that the camfer edges are prepared, a pocket may be milled into each individual card. The pocket may be milled into a backside of each transaction card at the same location on the transaction card that is embossed to provide characters on the front surface of each transaction card.

Figure 7:
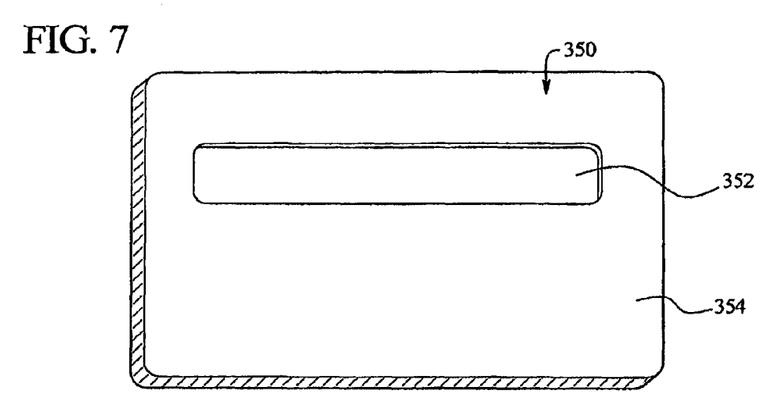
FIG. 7 illustrates a plan view of a titanium card made during the methods of making the titanium transaction cards.

FIG. 7 illustrates a titanium card 350 prepared by the method described in FIG. 5. Specifically, the transaction card has a pocket 352 that is milled into the backside 354 of a titanium card that eventually will be manufactured into a transaction card, having typical transaction card functionality.

Figure 8:
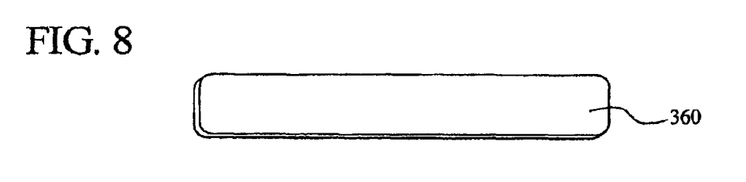
FIG. 8 illustrates a plan view of a fill panel made during the methods of making the titanium transaction cards.
Figure 10:
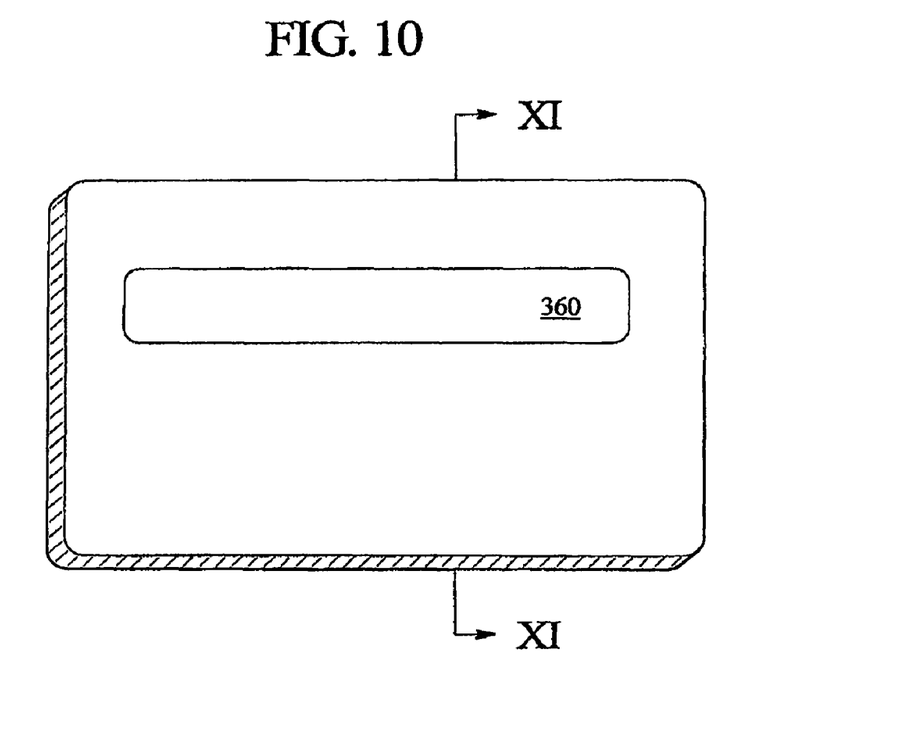
FIG. 10 illustrates a plan view of a titanium card having a fill panel disposed within a pocket.

Referring now to FIG. 5, the 15 mil thick titanium sheets may then be cut into individual fill panels via step 306. FIG. 8 illustrates a fill panel 360 made by the process described herein with respect to FIG. 5. The fill panel will fit within the pocket 352, as shown in FIG. 7, when placed therein with a suitable adhesive. When the fill panel is disposed within the pocket 352 with a suitable adhesive, the fill panel forms a smooth surface on the backside of the titanium card 354, as illustrated by FIG. 10.

Both the cards and the fill panels may then be brushed via step 308 to provide a nice finish on each transaction card made. Typically, the brushing is done via known titanium brushing techniques to provide titanium surfaces having a grain running in the same direction. The brushing may also create titanium surfaces on each transaction card having any other type of pattern.

Both sides of each titanium card may be coated via step 310 by physical vapor deposition ("PVD") of a coating that may be utilized to both protect the titanium surfaces and provide a distinctive appearance. Preferably, the coating may be titanium carbonitride, which, when vapor deposited on the surfaces of each titanium card, provides an even and substantially black coating to each surface of each titanium card. One surface of each fill panel may also be coated by physical vapor deposition. Specifically, the surface of the fill panel that is disposed on the outside of the transaction card when the fill panel is adhesively disposed within the pocket 352 should be coated by physical vapor deposition. Other coating techniques may also be utilized to provide the coating on the titanium card as apparent to one having skill in the art.

Graphics may then be laser etched into the titanium card via step 312. Specifically, the laser etching may etch both the coating and the titanium to provide the graphics, as described above.

Primer may be applied to the backside of each titanium card via step 314 to allow the magnetic stripe and the signature panel to be hot stamped thereon, via step 316. A primer material that may be utilized is known as "passport transfer material," and may be utilized to allow the magnetic stripe and the signature panel to adhere to the titanium and/or the coating applied by physical vapor deposition, as described above. The signature panel and the magnetic stripe may be substantially similar to or identical to typical magnetic stripes and signature panels typically utilized in transaction cards.

Figure 9:
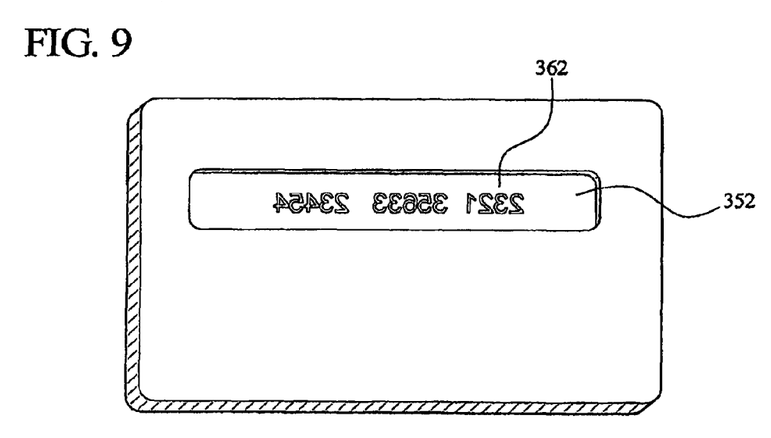
FIG. 9 illustrates a plan view of an embossed titanium card made during the methods of making the titanium transaction cards.

Each titanium card may then be embossed via step 318. The embossing of the characters may be applied on the surface of the titanium within the pocket, as illustrated in FIG. 9 by a suitable embossing machine, such as an addressograph machine, wherein each embossed character 362 is represented by an "X". The embossing is done within the pocket 352 so that the embossing may be done in titanium that is thinner than the total thickness of the transaction card. It has been found that embossing the characters 362 in thinner titanium is easier, and provides clearer and more visible characters, without distortion or warping of the characters or of the transaction card.

The recordable media that may be contained within each titanium card may then be recorded via step 320. For example, magnetic stripes are typically disposed on a surface of a transaction card. The magnetic stripe disposed on the surface of each titanium card may be encoded via step 320. In addition, if other recordable media are present, such as an embedded microchip, it may be encoded via step 320.

Each embossed character displayed on the front surface of each transaction card may then be "tipped" or sanded or abraded to remove the coating applied by the physical vapor deposition. This allows each character to obtain a metallic hue that is easily and clearly visible when contrasted with the substantially black coating on the remainder of the transaction card.

Figure 11:
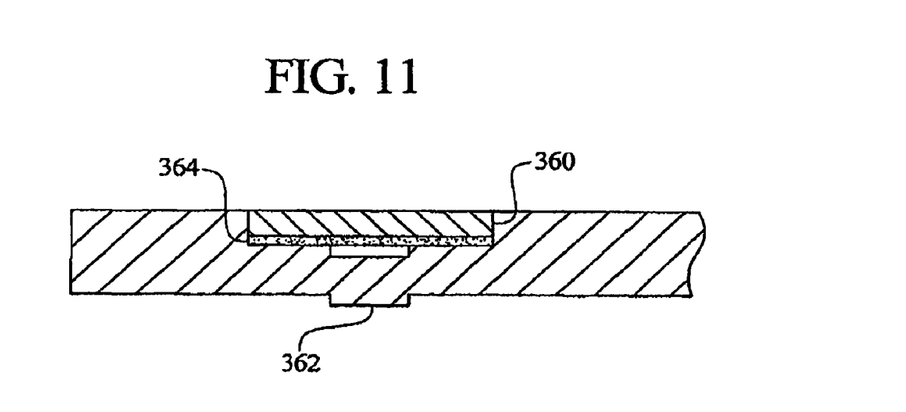
FIG. 11 illustrates a cross-sectional view of the titanium card having the fill panel disposed within the pocket.

The fill panel 360 may then be adhered within the pocket 352 via step 324. A suitable adhesive may be utilized that adheres the titanium surface of the fill panel 360 with the titanium surface within the pocket 352 or the coating that may be on the surface of within the pocket 352 by physical vapor deposition. A suitable adhesive is known as "die mount adhesive", which is a heat activated film. FIG. 10 illustrates a titanium card with the fill panel 360 disposed within the pocket. FIG. 11 illustrates a cross-sectional view of the transaction card of FIG. 10 illustrating an adhesive 364 that may adhere the fill panel 360 within the pocket. An embossed character 362 is further illustrated in FIG. 11 protruding from the front surface of the transaction card. Utilizing the fill panel 360 provides embossed characters that protrude from the front surface of the transaction card without being visible from the backside of the transaction card.

Figure 6:
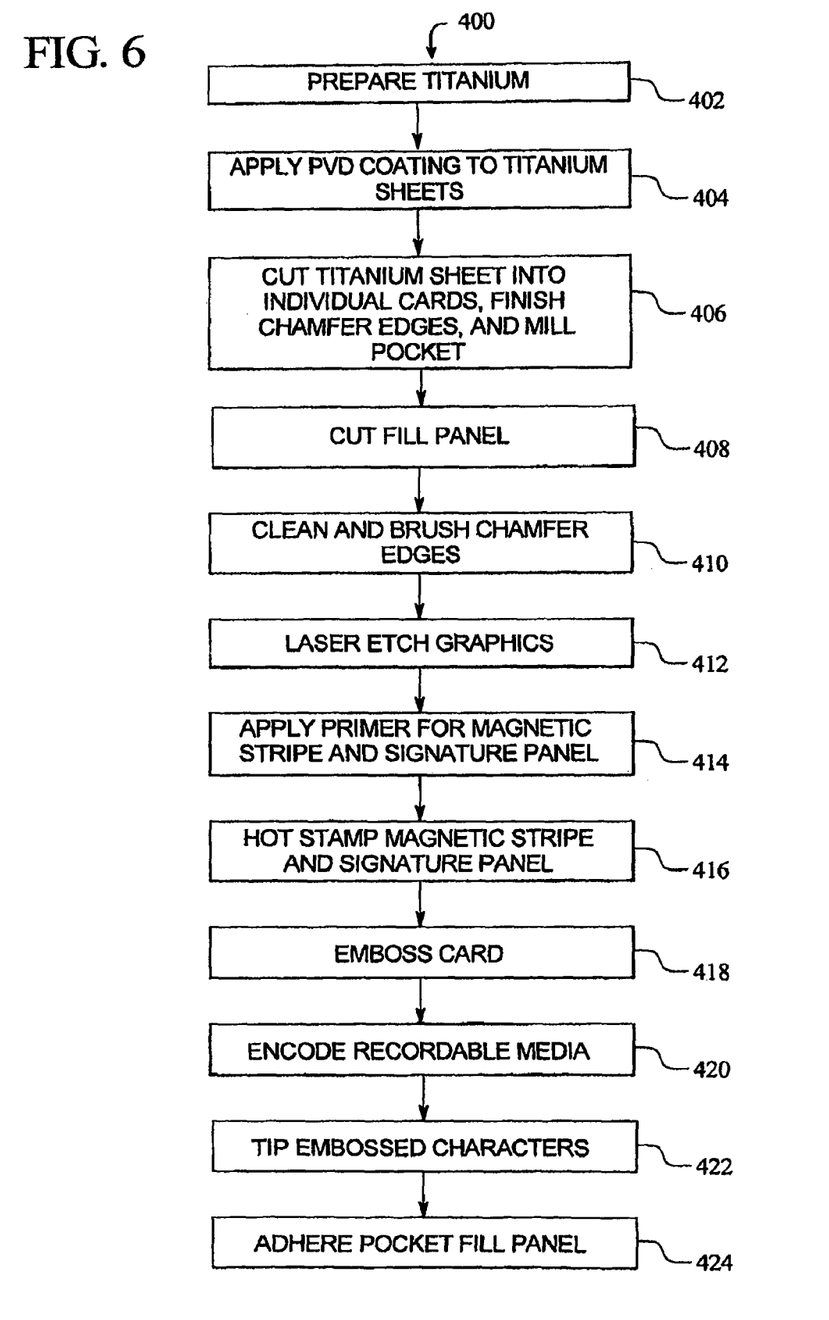
FIG. 6 illustrates an alternate flow chart showing a still further alternate method of making titanium transaction cards.

FIG. 6 illustrates an alternate method 400 of making titanium transaction cards. The method 400 is similar to the method 300, described above with respect to FIG. 5. However, the transaction card made by the method 400 may have a chamfer edge that is bare. In other words, the titanium transaction card may have a coating thereon, such as applied via physical vapor deposition. However, the chamfer edges may have a metallic hue because the coating may be removed at the edges to create a transaction card having a metallic "frame" around each transaction card.

A first step 402 of preparing the titanium sheets may be similar, if not identical, to the step of preparing the sheets as described in FIG. 5, above. Step 404 entails applying the coating to the titanium sheets so that the entire titanium sheets are coated prior to cutting the sheets into individual cards and fill panels, which is done via step 406. When cutting each titanium sheet into individual titanium cards via step 406, each edge of each transaction card may be beveled to create the chamfer edges without the coating disposed thereon. The pocket, as illustrated in FIG. 7 is also milled during step 406.

The fill panels are cut from the 15 mil thick titanium sheets via step 408. When coating the titanium sheets utilized as the fill panels, only one surface of the sheet need be coated via vapor deposition. However, having both surfaces coated by physical vapor deposition does not change the method described herein.

Each chamfer edge may be brushed and cleaned via step 410 to provide smooth edges having metallic grain running in the same direction. Alternatively, the edges may be brushed to provide patterns in the titanium on the edges of the transaction cards.

The titanium cards may then be etched to provide graphics via step 412. Primer may be applied for the magnetic stripe and signature panel for each transaction card via step 414. The magnetic stripe and signature panel may be applied via step 416. The card may be embossed via step 418. The recordable media may be encoded via step 420. Each embossed character may be "tipped" via step 422. And the fill panel may be adhered within the pocket via step 424. Each step 412-424 may be substantially similar to or identical to the steps 312-324, as described above with respect to FIG. 5.

It should be noted that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A method of creating a transaction card, said method comprising:
    embossing said transaction card within a hollow pocket to form embossed characters on a first surface of said transaction card;
    filling said hollow pocket with a fill panel on a second surface of said transaction card and, wherein a third surface of said fill panel is in contact with an interior of said hollow pocket;
    wherein said first surface of said transaction card is comprised of a metal layer, and wherein said metal layer comprises a coating; wherein a signature panel is applied to said fill panel.

2. The method of claim 1, wherein said first surface of said transaction card is comprised of a metal layer and wherein said metal layer comprises at least one of titanium, aluminum, stainless steel, and anodizing to provide an oxide layer on said first surface.

3. The method of claim 1, wherein said coating comprises a material selected from said group consisting of silane, polyethylene terephthalate, acrylic, titanium carbonitride, a thermoset polymeric material and a dye for providing a color to said transaction card.

4. The method of claim 1, wherein said filling said hollow pocket results in a substantially flush surface on said second surface.

5. The method of claim 1, wherein an adhesive is applied to said fill panel and a signature panel is applied to said adhesive.

6. The method of claim 1, wherein said fill panel comprises at least one of a thermoplastic polymer, titanium, aluminum or stainless steel.

7. The method of claim 1, wherein said fill panel comprises a thermoplastic polymer selected from said group consisting of polyvinyl chloride and polyethylene terephthalate copolymer.

8. The method of claim 1, wherein said transaction card further comprises laser etching.

9. A transaction card comprising:
    a first surface of said transaction card; and a fill panel disposed in a hollow pocket of said first surface to form a second surface opposite that of said first surface, wherein said hollow pocket comprises embossed characters that protrude from said first surface; wherein said first surface of said transaction card is comprised of a metal layer, and wherein said metal layer comprises a coating; wherein a signature panel is applied to said fill panel.

10. The transaction card of claim 9, wherein said first surface comprises a metal layer, and wherein said metal layer comprises at least one of titanium, aluminum, stainless steel and a coating.

11. The transaction card of claim 9, wherein said fill panel comprises at least one of a thermoplastic polymer, titanium, aluminum and stainless steel.

12. The transaction card of claim 9, wherein said first surface comprises a metal layer and wherein said metal layer comprises a coating, wherein said coating comprises a material selected from the group consisting of silane, polyethylene terephthalate, acrylic, titanium carbonitride, and a thermoset polymeric material.

13. The transaction card of claim 9, wherein said first surface comprises a metal layer and wherein said metal layer comprises a coating, and wherein said coating comprises a dye for providing a color to said transaction card.

14. The transaction card of claim 9, wherein an adhesive is applied to said fill panel and a signature panel is applied to said adhesive.

15. The transaction card of claim 9, wherein said first surface comprises a metal layer, and wherein said metal layer is anodized to provide an oxide layer on said first surface.

* * * * *

UNITED STATES PATENT AND TRADEMARK OFFICE
CERTIFICATE OF CORRECTION

PATENT NO. : 8,079,514 B2  
APPLICATION NO. : 13/116922  
DATED : December 20, 2011  
INVENTOR(S) : Lasch et al.

Page 1 of 1

It is certified that error appears in the above-identified patent and that said Letters Patent is hereby corrected as shown below:

On the Title page, Item (57) Abstract, please delete "2 14" and insert therefor --2 1/4--.

Signed and Sealed this  
Seventh Day of February, 2012

David J. Kappos  
*Director of the United States Patent and Trademark Office*